United States Patent [19]

Liu et al.

[11] Patent Number: 4,661,963
[45] Date of Patent: Apr. 28, 1987

[54] RECOVERY SYSTEM FOR XENON CHLORIDE LASER

[75] Inventors: Chi-Sheng Liu, Monroeville Boro, Pa.; Donald W. Feldman, Los Alamos, N. Mex.

[73] Assignee: Westinghouse Electric Corp., Pittsburgh, Pa.

[21] Appl. No.: 788,301

[22] Filed: Oct. 17, 1985

[51] Int. Cl.$^4$ .............................................. H01S 3/223
[52] U.S. Cl. ........................................ 372/59; 372/57
[58] Field of Search ........................ 372/56, 57, 58, 59, 372/60

[56] References Cited

U.S. PATENT DOCUMENTS

| | | | |
|---|---|---|---|
| 3,634,778 | 1/1972 | Melikian | 372/55 |
| 3,648,194 | 3/1972 | Melikian et al. | 372/55 |
| 3,668,549 | 6/1972 | Biancardi et al. | 372/55 |
| 3,745,483 | 7/1973 | Huchital et al. | 372/55 |
| 4,031,484 | 6/1977 | Freiberg et al. | 372/56 |
| 4,063,191 | 12/1977 | Ault et al. | 372/56 |
| 4,143,336 | 3/1979 | Searles et al. | 372/57 |
| 4,607,371 | 8/1986 | Eden et al. | 372/56 |

OTHER PUBLICATIONS

C. S. Liu et al "How to Make a Long-Lived Practical HgBr Laser", Jun. 1984, conference on Lasers and Electro-Optics.

Primary Examiner—Gene Wan
Attorney, Agent, or Firm—R. D. Fuerle

[57] ABSTRACT

Disclosed is a method of maintaining the power of the output of a xenon chloride laser. The gases in the lasing chamber are circulated between the lasing chamber and a reforming chamber. In the reforming chamber, the gases are contacted with at least one metal chloride which is chemically less stable than hydrogen chloride. The temperature of the metal chloride in the reforming chamber is maintained between the condensation temperature of hydrogen chloride and the dissociation temperature of the metal chloride used. Also disclosed is apparatus for performing this method.

12 Claims, 1 Drawing Figure

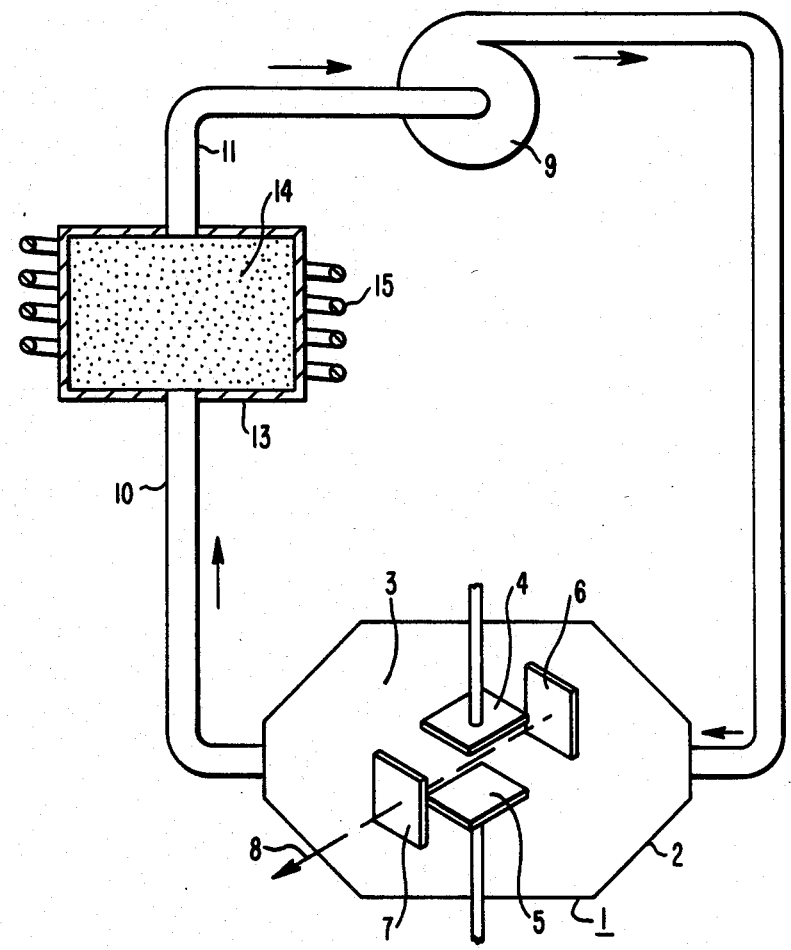

RECOVERY SYSTEM FOR XENON CHLORIDE LASER

BACKGROUND OF THE INVENTION

In a xenon chloride excimer laser, an electric glow discharge causes hydrogen chloride and xenon gases to react, and excites the resulting xenon chloride, XeCl, so that it lases. As the laser operates, its power gradually diminishes. When the loss of power renders the laser unsuitable for its intended use, the gases in the lasing chamber must be replaced with fresh hydrogen chloride and possibly xenon. This is frequently inconvenient and requires a costly shutdown of the laser.

SUMMARY OF THE INVENTION

We have discovered that xenon chloride lasers can be operated continuously without any loss of power, and without the addition of fresh hydrogen chloride, if the gases in the lasing chamber are continuously circulated through a reforming chamber. The reforming chamber contains a metal chloride of less chemical stability than hydrogen chloride, at a temperature between the condensation temperature of hydrogen chloride and the dissociation temperature of the metal chloride used.

DESCRIPTION OF THE PREFERRED EMBODIMENT

The accompanying drawing is a diagrammatic view of a certain presently preferred embodiment of apparatus according to this invention for maintaining the power output of a xenon chloride laser.

In the drawing, a laser 1 consists of a lasing chamber 2 which is filled with a mixture of gases 3, which includes xenon, hydrogen chloride, and an inert buffer gas (preferably helium, because it is inexpensive and has high thermal conductivity). Two electrodes 4 and 5 create an electric glow discharge that results in the formation of xenon chloride in the lasing chamber. The electric glow discharge excites the xenon chloride and produces a high repetition rate laser pulse between fully reflecting mirror 6 and partially transmitting mirror 7, resulting in laser output 8. A blower 9 continuously circulates the gases in lasing chamber 2 through conduits 10, 11, and 12 and reforming chamber 13. Reforming chamber 13 contains a metal chloride 14 of less chemical stability than hydrogen chloride. Electric resistance heater 15 maintains the temperature in reforming chamber 13 between the condensation temperature of hydrogen chloride and the dissociation temperature of the metal chloride used.

While we do not wish to bound by any theories, we believe that the method and apparatus of this invention overcome the problem of the gradual diminution of power in xenon chloride lasers by reforming hydrogen chloride to replace hydrogen chloride that is lost. We believe that the loss of hydrogen chloride occurs when hydrogen chloride in the lasing chamber dissociates into hydrogen and chlorine, and the free chlorine reacts with metals in the lasing chamber, such as nickel, and is thereby depleted. In the process of this invention, the excess hydrogen that results is reacted with the metal chloride in the reforming chamber to reform hydrogen chloride. This reaction in the reforming chamber can be described by the equation:

$$xH_2 + 2MCl_x \rightarrow 2xHCl + 2M$$

where $MCl_x$ represents the metal halide and x is the valence of M. Any metal chloride can be used in the reforming chamber that is less stable than hydrogen chloride. Examples of such metal chlorides include $ReCl_3$, $MoCl_2$, $MoCl_4$, $WCl_2$, $WCl_3$, and $WCl_5$. The preferred metal chloride is $MoCl_2$ because it is readily available and is much less stable than is hydrogen chloride. The metal chloride must be placed in the reforming chamber so that the gases from the lasing chamber pass in intimate contact with it. This means that the metal chloride should be in a form that has a high surface area, such as a fine powder. It is useful to place the metal chloride on a suspending agent, such as quartz wool, to prevent the powder from being compacted. The gases from the lasing chamber can also be used to fluidize the metal chloride power. The temperature in the reforming chamber must be higher than the temperature at which hydrogen chloride condenses to prevent the condensation of hydrogen chloride in the reforming chamber, but the temperature must be below the temperature at which the metal chloride dissociates. The flow rate of the gases through the reforming chamber is not critical, and as long as the laser power output does not fall, the flow rate should be considered to be adequate. The amount of metal chloride in the reforming chamber is also not critical but, as it will gradually be depleted, less frequent replacements will be needed if a larger amount is used.

We claim:

1. In a xenon chloride excimer laser having a lasing chamber containing gases, a method of maintaining the power output of said laser, comprising circulating said gases between said lasing chamber and a reforming chamber, and contacting said gases in said reforming chamber with at least one metal chloride of less chemical stability than hydrogen chloride, at a temperature between the condensation temperature of hydrogen chloride and the dissociation temperature of the metal chloride used.

2. A method according to claim 1 wherein said metal chloride is molybdenum chloride.

3. A method according to claim 1 wherein said gases include hydrogen chloride, xenon, and helium.

4. A method according to claim 1 wherein said metal chloride is selected from the group consisting of $ReCl_3$, $MoCl_3$, $MoCl_4$, $WCl_2$, $WCl_3$, and $WCl_5$.

5. A method according to claim 1 wherein said metal chloride is a powder held on a suspending agent.

6. A method according to claim 5 wherein said suspending agent is quartz wool.

7. In a xenon chloride laser having a lasing chamber that contains gases, including hydrogen chloride and xenon, apparatus for maintaining the power of the output of said laser comprising:
(A) a reforming chamber containing at least one metal chloride of less chemical stability than hydrogen chloride;
(B) conduit means between said reforming chamber and said lasing chamber;
(C) pump means for circulating gases through said conduit means between said lasing chamber and said reforming chamber in contact with said metal chloride; and
(D) means for heating said reforming chamber to a temperature between the condensation temperature of said hydrogen chloride and the dissociation temperature of the metal chloride used.

8. Apparatus according to claim 7 wherein said metal chloride is molybdenum chloride.

9. Apparatus according to claim 7 wherein said gases include a buffer gas of helium.

10. Apparatus according to claim 7 wherein said metal chloride is selected from the group consisting of $ReCl_3$, $MoCl_3$, $MoCl_4$, $WCl_2$, $WCl_3$, and $WCl_5$.

11. Apparatus according to claim 7 wherein said metal chloride is a powder held on a suspending agent.

12. Apparatus according to claim 11 wherein said suspending agent is quartz wool.

* * * * *